United States Patent
Lee (10) Patent No.: US 7,127,540 B2
(45) Date of Patent: Oct. 24, 2006

(54) APPARATUS AND METHOD FOR CONTROLLING FREQUENCY OF BUS USE

(75) Inventor: Hoi-jin Lee, Seongnam (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/447,413

(22) Filed: May 29, 2003

(65) Prior Publication Data

US 2004/0006659 A1 Jan. 8, 2004

(30) Foreign Application Priority Data

Jul. 5, 2002 (KR) ............... 2002-38891

(51) Int. Cl.
*G06F 13/24* (2006.01)
(52) U.S. Cl. ...................... 710/243; 710/111
(58) Field of Classification Search ............... 710/243, 710/111, 107, 113, 117, 240, 244, 36, 40, 710/42, 241
See application file for complete search history.

(56) References Cited

U.S. PATENT DOCUMENTS

| | | | | |
|---|---|---|---|---|
| 5,051,946 A | * | 9/1991 | Cubranich et al. | 710/111 |
| 5,530,903 A | * | 6/1996 | Calvignac et al. | 710/41 |
| 5,581,782 A | | 12/1996 | Sarangdhar et al. | 395/800 |
| 6,076,132 A | * | 6/2000 | Chen | 710/241 |
| 6,092,137 A | * | 7/2000 | Huang et al. | 710/111 |
| 6,163,542 A | * | 12/2000 | Carr et al. | 370/399 |
| 6,311,249 B1 | * | 10/2001 | Min et al. | 710/111 |
| 2002/0138678 A1 | * | 9/2002 | Kim et al. | 710/240 |

FOREIGN PATENT DOCUMENTS

KR 1998-073176 11/1998

* cited by examiner

*Primary Examiner*—Rehana Perveen
*Assistant Examiner*—Clifford Knoll
(74) *Attorney, Agent, or Firm*—Mills & Onello LLP (57) ABSTRACT

In a bus arbitration method and bus arbiter which simultaneously considers fairness and priority and enables fairness and priority to be readjusted by a program, that is, by software, arbitration for ownership of a bus connected to a plurality of bus masters comprises grouping the plurality of bus masters into a plurality of groups and arbitrating the frequency of each bus master's ownership of the bus according to the result of the grouping. It is preferable that each of the plurality of groups has a priority different from the priorities of the others, and in arbitrating the frequency of each bus master owning the bus, arbitration of ownership of the bus by bus masters belonging to the same group is performed according to a round-robin method.

28 Claims, 9 Drawing Sheets

| GROUP-I | OPPORTUNITY | GROUP-J | OPPORTUNITY |
|---|---|---|---|
| A | 1/2 | B,C,D,E,F | 1/10 |
| A,B | 1/3 | C,D,E,F | 1/12 |
| A,B,C | 1/4 | D,E,F | 1/12 |
| A,B,C,D | 1/5 | E,F | 1/10 |
| A,B,C,D,E | 1/6 | F | 1/6 |

FIG. 4

| GROUP-I | OPPORTUNITY | GROUP-J | OPPORTUNITY |
|---|---|---|---|
| A | 1/2 | A,B,C,D,E,F | 1/12 |
| A,B | 1/3 | A,C,D,E,F | 1/15 |
| A,B,C | 1/4 | A,D,E,F | 1/16 |
| A,B,C,D | 1/5 | A,B,E,F | 1/20 |
| A,B,C,D,E | 1/6 | A,F | 1/12 |

FIG. 5

| GROUP-I | OPPORTUNITY | GROUP-J | OPPORTUNITY |
|---|---|---|---|
| A | 1/2 | A,B,C,D,E,F | 1/12 |
| A,B | 1/3 | A,B,C,D,E,F | 1/18 |
| A,B,C | 1/4 | A,B,C,D,E,F | 1/24 |
| A,B,C,D | 1/5 | A,B,C,D,E,F | 1/30 |
| A,B,C,D,E | 1/6 | A,B,C,D,E,F | 1/36 |

| GROUP-I | OPPORTUNITY | GROUP-J | OPPORTUNITY | GROUP-K | OPPORTUNITY |
|---------|-------------|---------|-------------|---------|-------------|
| A | 1/2 | B | 1/4 | C,D,E,F | 1/16 |
| A | 1/2 | B,C | 1/6 | D,E,F | 1/18 |
| A | 1/2 | B,C,D | 1/8 | E,F | 1/16 |
| A | 1/2 | B,C,D,E | 1/10 | F | 1/10 |

| Case(Req_x) | Tokenx | Token_ledx |
|---|---|---|
| XXXXX1 | 000001 | 000001 |
| XXXX10 | 000010 | 000011 |
| XXX100 | 000100 | 000111 |
| XX1000 | 001000 | 001111 |
| X10000 | 010000 | 011111 |
| 100000 | 100000 | 111111 |
| 000000 | 000000 | 000000 |

APPARATUS AND METHOD FOR CONTROLLING FREQUENCY OF BUS USE

CROSS-REFERENCE TO RELATED APPLICATIONS

This application claims the priority of Korean Patent Application No. 2002-38891, filed Jul. 5, 2002, which is incorporated herein in its entirety by reference.

BACKGROUND OF THE INVENTION

1. Field of the Invention

The present invention relates to a bus arbitration method and a bus arbiter, and more particularly, to a bus arbitration method by which the frequency of bus use can be controlled, a bus arbiter therefor, and a bus system having the bus arbiter.

2. Description of the Related Art

In general, a bus arbiter performs bus arbitration among a plurality of bus masters connected to a bus. Each bus master outputs a request signal to the bus arbiter. The request signal contains information related to the request of use of the bus. The bus arbiter receives the request signal generated by each bus master, and in a predetermined order outputs a grant signal to each bus master. The grant signal contains information granting the use of the bus.

The conventional bus arbiter performs bus arbitration by using either a fixed priority method, or a fairness method, such as a round-robin method. In the fixed priority method, the bus arbiter allocates in advance a different priority to each of a plurality of bus masters, and outputs a grant signal to the bus master having the highest priority. Each priority allocated to one of the plurality of bus masters is generally fixed as a constant value.

The round-robin method is a method by which all elements in one group are fairly selected in a rational order. Generally in the round-robin method, each element is selected one-by-one in the direction from the top of a list to the bottom of the list, when all elements have been selected, then the process again begins with the element at the top of the list. That is, the round-robin method can be understood as a method in which bus opportunities are received by taking turns.

Therefore, for a bus arbiter employing the round-robin method, each bus master fairly uses the bus in a rational order. Consequently, in the case where a predetermined bus master requires preferential use of the bus, the bus master cannot always obtain such preferential use. Also, for a bus arbiter employing the fixed priority method, a bus master having a low priority may not use the bus. These limitations are complicated by the fact that in general, conventional bus arbitration is hard wired in hardware, and therefore is difficult to reconfigure.

SUMMARY OF THE INVENTION

To address the above limitations, it is an objective of the present invention to provide a bus arbitration method by which fairness and priority of a bus arbiter are guaranteed at the same time, and by which fairness and priority can be readjusted by a program, that is, by software, and a bus arbiter therefor.

According to an aspect of the present invention, there is provided a method of arbitrating for ownership of a bus connected to a plurality of bus masters, comprising grouping the plurality of bus masters into a plurality of groups and arbitrating the ownership of the bus by each bus master according to the grouping.

It is preferable that each of the plurality of groups has a priority that is different than the priorities of the others. It is also preferable that in arbitrating the ownership of the bus by each bus master, arbitration of ownership of the bus by bus masters belonging to the same group is performed according to a round-robin method.

According to another aspect of the present invention, there is provided a method of arbitrating for ownership of a bus, comprising grouping a plurality of bus masters into a plurality of groups and arbitrating each bus master owning the bus according to which of the plurality of groups each bus master belongs.

It is preferable that in grouping the bus masters, the bus masters are grouped according to the frequency of each bus master owning the bus.

According to another aspect of the present invention, there is provided a method of arbitrating for ownership of a bus by a plurality of bus masters in a bus system, in which the plurality of bus masters and a bus arbiter that arbitrates the ownership of the bus by each of the plurality of bus masters are all connected by the bus, the method comprising grouping the plurality of bus masters into a plurality of groups and arbitrating ownership of the bus by each bus master according to the group to which each master belongs, wherein ownership of the bus is arbitrated according to a priority method between bus masters of different groups and according a round-robin method between bus masters belonging to the same group.

According to another aspect of the present invention, there is provided a bus arbiter for arbitrating ownership of a bus connected to each of a plurality of bus masters, the bus arbiter comprising a plurality of register blocks, and a grant signal generation circuit which receives an output signal of each of the plurality of register blocks and outputs a grant signal for granting the ownership of the bus to a corresponding bus master in response to a control signal, wherein the plurality of bus masters are grouped into a plurality of groups, and wherein each of the plurality of register blocks stores information related to bus masters belonging to a group corresponding to that register block.

It is preferable that each of the plurality of register blocks groups the plurality of bus masters into one of the plurality of Groups by a predetermined program. It is also preferable that the frequency of each of the plurality of bus masters owning the bus is determined by information on the bus master.

It is preferable that each of the plurality of register blocks comprises a group register block which has a plurality of storage devices for storing information on the bus masters belonging to a group corresponding to the register block, and a plurality of logic gates which receives request signals output from the plurality of bus masters through the bus and output signals of the storage devices, performs logic operations, and outputs the results to the grant signal generation circuit.

It is preferable that the grant signal generation circuit comprises a plurality of internal grant signal generation circuits, each of which receives a corresponding enable signal and an output signal output from a corresponding register block, and outputs an internal grant signal, and a selection circuit which receives respective internal grant signals, and outputs the grant signal to a corresponding bus master in response to the control signal.

It is preferable that each of the plurality of internal grant signal generation circuits performs arbitration for ownership of the bus among bus masters belonging to the same group according to a round-robin method.

According to another aspect of the present invention, there is provided a bus arbiter comprising a plurality of register blocks, each of which stores information related to a plurality of bus masters belonging to a corresponding group, and a grant signal generation circuit which outputs a grant signal for granting the ownership of the bus connected to each of the plurality of bus masters to a corresponding bus master in response to an output signal of the corresponding register block.

According to another aspect of the present invention, there is provided a bus system comprising a bus, a bus arbiter connected to the bus, and a plurality of bus masters, each of which is connected to the bus and outputs a request signal for requesting ownership of the bus to the bus arbiter through the bus, wherein the bus arbiter comprises a plurality of register blocks, each of which stores information related to bus masters belonging to a corresponding group, the plurality of bus masters being grouped into a plurality of groups; and a grant signal generation circuit which outputs a grant signal for granting ownership of the bus to a corresponding bus master in response to the request signal input from the corresponding bus master.

It is preferable that each of the plurality of register blocks stores information related to the bus masters belonging to the corresponding group in a predetermined program. It is also preferable that the frequency of each of the plurality of bus master's ownership of the bus is determined by information on the bus master.

It is preferable that the grant signal generation circuit outputs the grant signal to a corresponding bus master in response to the request signal, in a predetermined order.

BRIEF DESCRIPTION OF THE DRAWINGS

The above objects and advantages of the present invention will become more apparent by describing in detail preferred embodiments thereof with reference to the attached drawings in which.

DEATILED DESCRIPTION OF PREFERRED EMBODIMENTS

Figure 1:
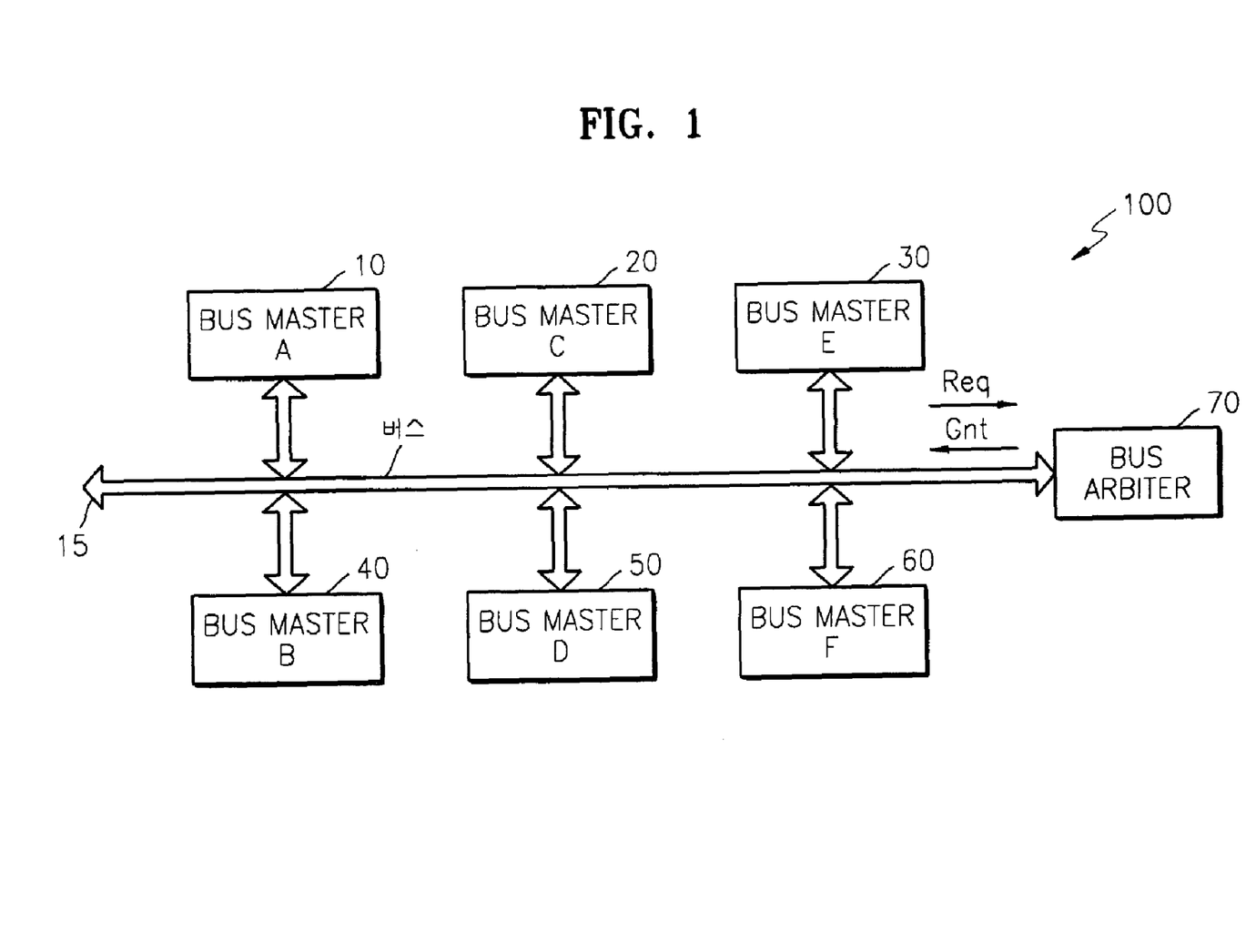
FIG. 1 is a block diagram of a bus system employing a bus arbiter according to the present invention.

FIG. 1 is a block diagram of a bus system employing a bus arbiter according to the present invention. The bus system 100 comprises a plurality of bus masters 10, 20, 30, 40, 50 and 60, a bus arbiter 70 and a bus 15.

The bus system 100 is used in a computer system. The bus 15 of the bus system may comprise, for example, a peripheral component interconnect (PCI) bus and an advanced micro-controller bus architecture (AMBA) bus.

Each bus master 10 through 60 and the bus arbiter 70 are connected to the bus 15 and communicate a request signal (Req) and a grant signal (Gnt) between each other through the bus 15.

That is, each bus master 10 through 60 outputs a request signal (Req) to the bus arbiter 70. The request signal (Req) contains information requesting the use (or the temporary ownership) of the bus 15.

The bus arbiter 70 receives the request signal (Req) generated by each bus master 10 through 60 and outputs a grant signal (Gnt) in a predetermined order to each bus master 10 through 60. The grant signal (Gnt) contains information regarding the grant of the use of the bus 15. Bus masters 10 through 60 may be represented as A, B, C, D, E, and F, respectively.

The bus arbiter 70 according to the present invention comprises a plurality of register blocks, each of which, when the plurality of bus masters 10 through 60 are grouped into a plurality of groups by a predetermined method, stores information on a plurality of bus masters belonging to a group corresponding to the register block, and a grant signal generation circuit which outputs a grant signal (Gnt) for granting the ownership of the bus 15 to a bus master in response to a request signal (Req) input by the bus master.

Each of the plurality of register blocks stores information related to the plurality of bus masters belonging to a group corresponding to the register block by a predetermined program. The frequency of each of the plurality of bus masters 10 through 60 owning the bus 15 is determined by information on the bus masters 10 through 60.

The grant signal generation circuit, in response to a request signal (Req), outputs a grant signal (Gnt) to a corresponding bus master, repeatedly in a predetermined order.

Figure 2:
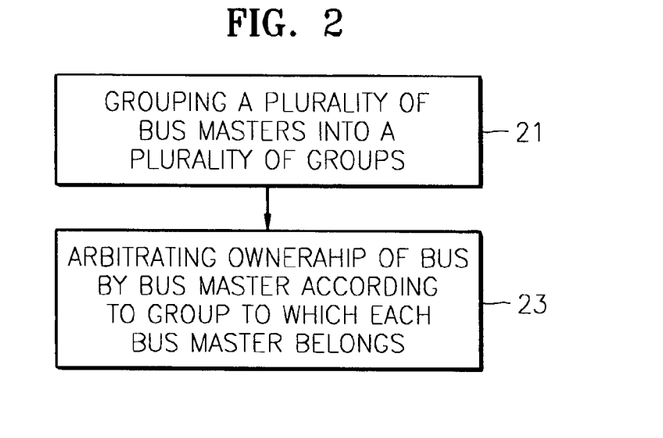
FIG. 2 is a flowchart of the steps of a bus arbitration method according to the present invention.

FIG. 2 is a flowchart of the steps of a bus arbitration method according to the present invention. Referring to FIGS. 1 and 2, the bus arbiter 70 groups the plurality of bus masters (A, B, C, D, E, and F) into a plurality of groups according to a predetermined program, that is, by software, in step 21. For example, the plurality of bus masters (A, B, C, D, E, and F) can be grouped into a plurality of groups according to frequency of the use of the bus 15 by the bus masters.

The bus arbiter 70 according to the present invention arbitrates or adjusts the use (or the ownership) of the bus 15 by each bus master according to a group to which the bus master (A, B, C, D, E, or F) belongs in step 23.

The arbitration method may be a priority method and/or a round-robin method. Here, each of the plurality of groups can have a different priority or fairness.

Also, ownership of the bus 15 among bus masters (A, B, C, D, E, and F) belonging to the same group can be arbitrated by priority or a round-robin method.

Figure 3:
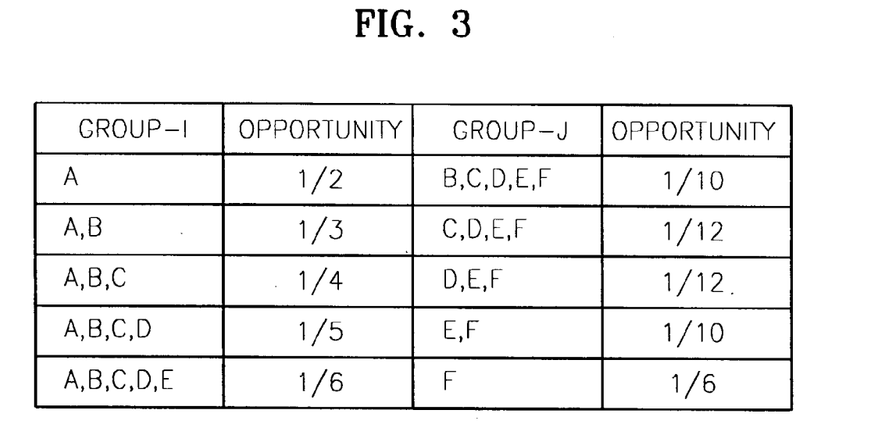
FIGS. 3 through 5 are tables showing bus masters grouped into two groups according to preferred embodiments of the present invention.
Figure 4:
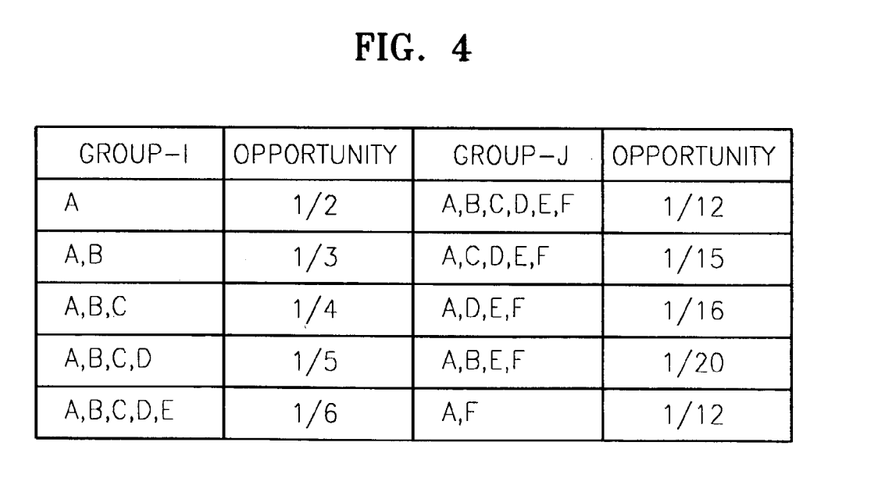
Figure 5:
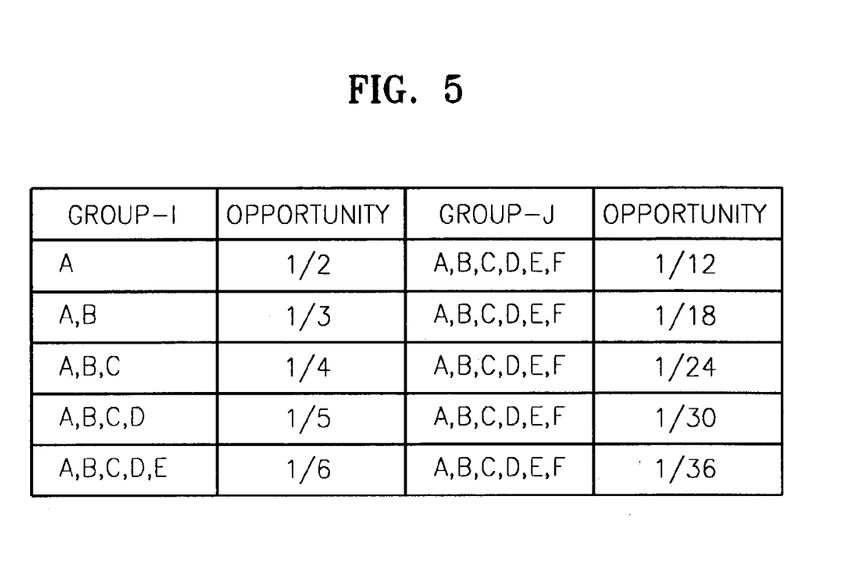

FIGS. 3 through 5 are tables illustrating bus masters grouped into two groups according to preferred embodiments of the present invention. Referring to FIGS. 1, 3, 4, and 5, each bus master (A, B, C, D, E, and F) is grouped into one of two groups (Group I and Group J) according to frequency of use of the bus 15 by the bus master (A, B, C, D, E, and F).

Alternatively, each bus master (A, B, C, D, E, and F) may be grouped by the selection of the user, regardless of frequency of use.

As another possible alternative, the plurality of bus masters (A, B, C, D, E, and F) can be grouped into 3 or more groups according to selection of the user or by an application program.

In the present embodiments, bus master(s) having relatively high frequencies of use of the bus 15 are grouped into Group I and bus master(s) having relatively low frequencies of use of the bus 15 are grouped into Group J, respectively. In this example, the priority of Group I is higher than the priority of Group J. That is, the frequency of ownership (or use) of the bus 15 by each bus master (A, B, C) forming Group I is higher than the frequency of ownership (or use) of the bus 15 by each bus master (D, E, F) forming Group J.

In this example, bus arbitration between different groups (for example, between Group I and Group J) is performed according to priority, and bus arbitration among bus masters belonging to the same group is performed by a round-robin method to guarantee fairness. Alternatively, bus arbitration within a group may also be performed according to priority.

Referring to FIGS. 1 and 3, the table of FIG. 3 shows cases where each bus master (A, B, C, D, E, and F) is included in Group I or Group J according to frequency of use of the bus 15.

For example, if bus master (A) is programmed to belong to Group I and bus masters (B, C, D, E, and F) are programmed to belong to Group J, the opportunity for bus master (A) to use the bus 15 is ½ and the opportunity for each of bus masters (B, C, D, E, and F) to use the bus 15 is ⅒.

Also, if bus masters (A, B) are programmed to belong to Group I and bus masters (C, D, E, F) are programmed to belong to Group J, the opportunity for each bus master (A, B) to use the bus 15 is ⅓ and the opportunity for each bus master (C, D, E, F) to use the bus 15 is ¹⁄₁₂. Examples that are not explained in detail can be readily understood by referring to FIG. 3.

Referring to FIGS. 1 and 3, the opportunity for each bus master (A, B, C, D, E, F) to use the bus 15 depends on which group (for example, Group I or Group J) the bus master (A, B, C, D, E, F) is programmed to belong to.

For example, in each case listed in the table of FIG. 3, the opportunity for bus master (A) to use the bus 15 can be adjusted to ½, ⅓, ¼, ⅕, or ⅙. the bus arbitration method according to the present invention can adjust the frequency or opportunity for use or ownership of the bus by each bus master.

Referring to FIGS. 1 and 4, when bus master (A) is programmed to belong to Group I and each bus master (A, B, C, D, E, F) is programmed to belong to Group J, the opportunity for bus master (A) to use the bus 15 is (½+¹⁄₁₂), and the opportunity for each bus master (B, C, D, E, F) to use the bus 15 is ¹⁄₁₂.

Also, when each bus master (A, B, C, D, E) is programmed to belong to Group I and each bus master (A, F) is programmed to belong to Group J, the opportunity for bus master (A) to use the bus 15 is (⅙+¹⁄₁₂), the opportunity for each bus master (B, C, D, E) to use the bus 15 is ⅙, and the opportunity for bus master (F) to use the bus 15 is ¹⁄₁₂.

Referring to FIGS. 1 and 5, when bus master (A) is programmed to belong to Group I and each bus master (A, B, C, D, E, F) is programmed to belong to Group J, the opportunity for bus master (A) to use the bus 15, or the frequency of ownership of the bus 15, is (½+¹⁄₁₂).

Also, when each bus master (A, B, C) is programmed to belong to Group I and each bus master (A, B, C, D, E, F) is programmed to belong to Group J, the opportunity for each bus master (A, B, C) to use the bus 15 is (⅓+¹⁄₂₄) and the opportunity for each bus master (D, E, F) to use the bus 15 is ¹⁄₂₄.

Referring to FIGS. 3 through 5, the bus arbitration method according to the present invention can adjust the frequency of ownership of the bus by each bus master according to whether the bus master is included in Group I or Group J or both Group I and Group J.

Since the examples of FIGS. 3 through 5 relate only to how the functions of the bus arbiter and the bus arbitration method according to the present invention are executed, all cases that are not shown in FIGS. 3 through 5 should be considered as alternative embodiments of the present invention.

Grouping of the bus masters according to the present invention can be performed by a predetermined program, for example, by software, and a detailed explanation of this will be provided later with reference to FIG. 10.

Figure 6:
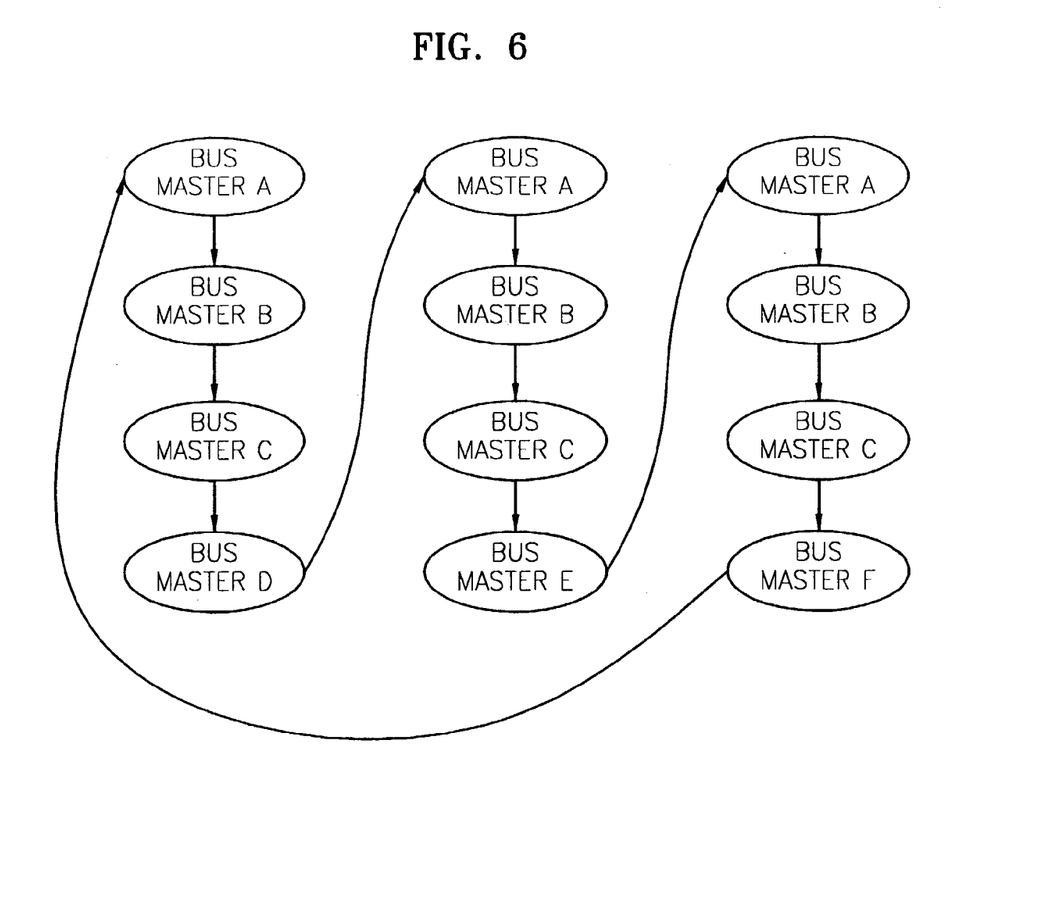
FIG. 6 is a state diagram showing circulation of bus ownership according to the bus arbitration method of the present invention.

FIG. 6 is a state diagram showing circulation of bus ownership according to the bus arbitration method of the present invention. Referring to FIGS. 3 and 6, when each bus master (A, B, C) is programmed to belong to Group I and each bus master (D, E, F) is programmed to belong to Group J, the circulation of bus ownership according to the bus arbitration method of the present invention is in order of bus master (A)->bus master (B)->bus master (C)->bus master (D)->bus master (A)->bus master (B)->bus master (C)->bus master (E)->bus master (A)->bus master (B)->bus master (C)->bus master (F)->bus master (A) . . .

After the opportunity of bus ownership is given to all of bus masters (A, B, C) included in Group I, the opportunity of bus ownership is given to one of bus masters (D, E, F) included in Group J. Thus, in order for all bus masters (A, B, C, D, E, F) to own the bus 15 by the priority and round-robin method of the present invention, a total of 12 bus arbitrations is needed. Put another way, each bus master (A, B, C) included in Group I has an opportunity of bus ownership of ³⁄₁₂=¼, while each bus master (D, E, F) included in Group J has an opportunity of bus ownership of ¹⁄₁₂.

Referring to FIG. 6, the circulation of bus ownership of the other examples of FIGS. 3 through 5 can be readily understood by one skilled in the art.

Figure 7:
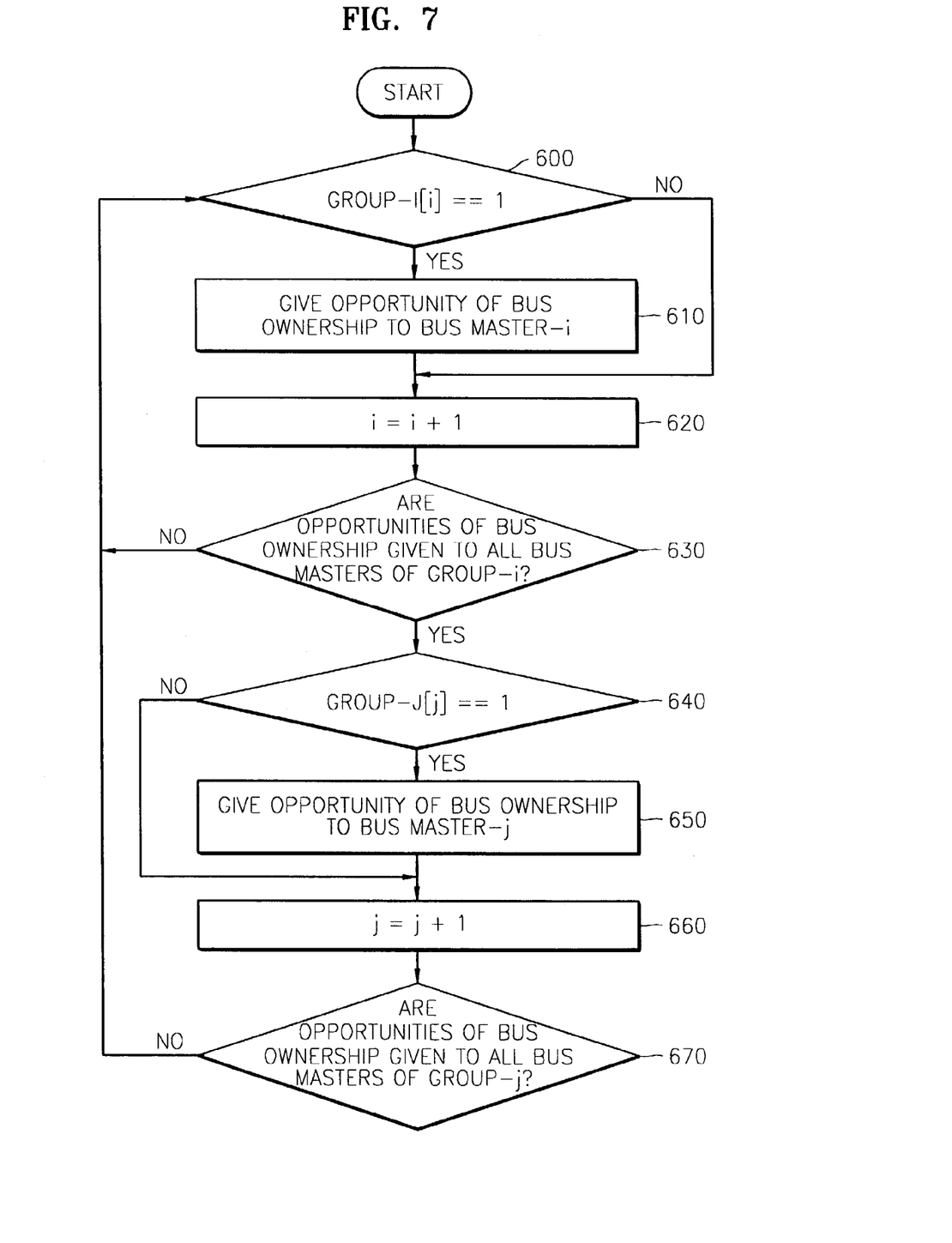
FIG. 7 is a flowchart of the steps of a bus arbitration method according to the present invention in which bus masters are grouped into two groups.

FIG. 7 is a flowchart of the steps of a bus arbitration method according to the present invention, in which bus masters are grouped into two groups. Referring to FIGS. 1, 6, and 7, the bus arbitration method in which bus masters are grouped into two groups will now be explained.

If bus masters (A, B, C) are included in Group I and bus masters (D, E, F) are included in Group J, then bus masters (A, B, C) would be expressed as 0, 1, 2, respectively, and bus masters (D, E, F) would be expressed as 3, 4, 5, respectively. Here, it is assumed that i is a number from 0 to 2 and j is a number from 3 to 5.

It is determined whether or not a bus master is included in Group I in step 600. First, if i is 0, bus master A is included in Group I. Accordingly, a bus ownership opportunity is given to bus master A in step 610 and i increases by 1 in step 620.

Then, it is determined whether or not bus ownership opportunities have been given to all bus masters of Group I in step 630. If the determination result of step 630 is "No", step 600 is performed again.

When step 600 is performed for the second time, if i is 1, bus master B is included in Group I. Accordingly, a bus ownership opportunity is given to bus master B in step 610, and i increases by 1 in step 620.

Then, it is determined whether or not bus ownership opportunities have been given to all bus masters of Group I in step 630. If the determination result of step 630 is "No", step 600 is performed again.

When step 600 is performed for the third time, if i is 2, bus master C is included in Group I. Accordingly, a bus ownership opportunity is given to bus master C in step 610, and i increases by 1 in step 620.

Then, it is determined whether or not bus ownership opportunities have been given to all bus masters of Group I in step 630. If the determination result of step 630 is "Yes", step 640 is performed.

It is determined whether or not a bus master is included in Group J in step 640. First, if j is 3, bus master D is included in Group J. Accordingly, a bus ownership opportunity is given to bus master D in step 650, and j increases by 1 in step 660.

Then, it is determined whether or not bus ownership opportunities have been given to all bus masters of Group J in step 670. If the determination result of step 670 is "No", step 600 is performed again.

Therefore, if steps 600 through 670 of FIG. 7 are repeatedly performed, the same circulation of bus ownership as shown in FIG. 6 can be obtained.

Figure 8:
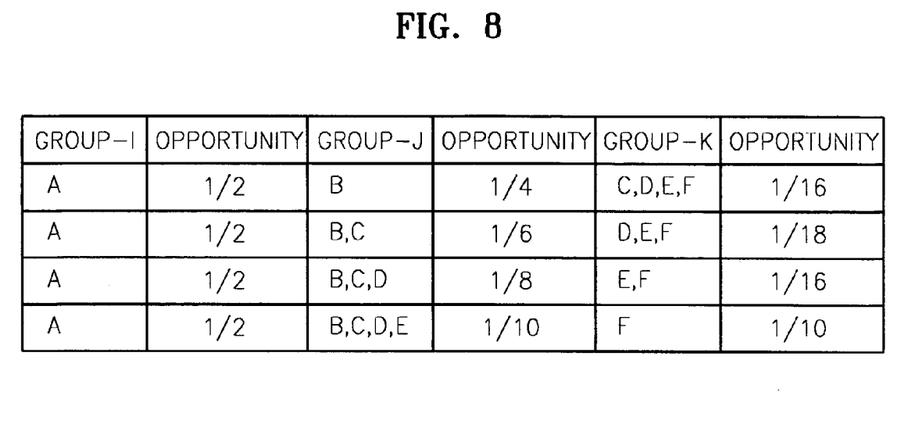
FIG. 8 is a table showing bus masters grouped into three groups according to a preferred embodiment of the present invention.

FIG. 8 is a table showing bus masters grouped into three groups according to a preferred embodiment of the present invention. Referring to FIGS. 1 and 8, bus masters (A, B, C, D, E, F) are grouped by a program into three groups according to frequency of use of the bus 15.

Group I is the group of bus master(s) having the highest frequency of use of the bus 15, Group J is the group of bus master(s) having the second highest frequency of use of the bus 15, and Group K is the group of bus master(s) having the lowest frequency of use of the bus 15. Therefore, the frequency of use of the bus 15 by the bus master(s) included in Group I is higher than the frequency of use of the bus 15 by the bus master(s) included in Group J. Also, the frequency of use of the bus 15 by the bus master(s) included in Group J is higher than the frequency of use of the bus 15 by the bus master(s) included in Group K.

For example, if the bus arbiter 70 is programmed so that bus master (A) is included in Group I, each bus master (B, C) is included in Group J, and each bus master (D, E, F) is included in Group K, the circulation of bus ownership according to the bus arbitration of the present invention is as follows. The bus arbiter 70 arbitrates the bus 15 in order of A->B->A->C->A->D->A->B->A->C->A->E->A->B->A->C->A->F. Therefore, the opportunity for bus master (A) to use the bus 15 is $9/18=1/2$, the opportunity for each bus master (B, C) to use the bus 15 is $3/18=1/6$, and the opportunity for each bus master (D, E, F) to use the bus 15 is $1/18$.

Also, if the bus arbiter 70 is programmed so that bus master (A) is included in Group I, each bus master (B, C, D) is included in Group J, and each bus master (E, F) is included in Group K, the circulation of bus ownership according to the bus arbitration of the present invention is as follows. The bus arbiter 70 arbitrates the bus 15 in order of A->B->A->C->A->D->A->E->A->B->A->C->A->D->A->F. Therefore, the opportunity for bus master (A) to use the bus 15 is $1/2$, the opportunity for each bus master (B, C, D) to use the bus 15 is $1/8$, and the opportunity for each bus master (E, F) to use the bus 15 is $1/16$.

Figure 9:
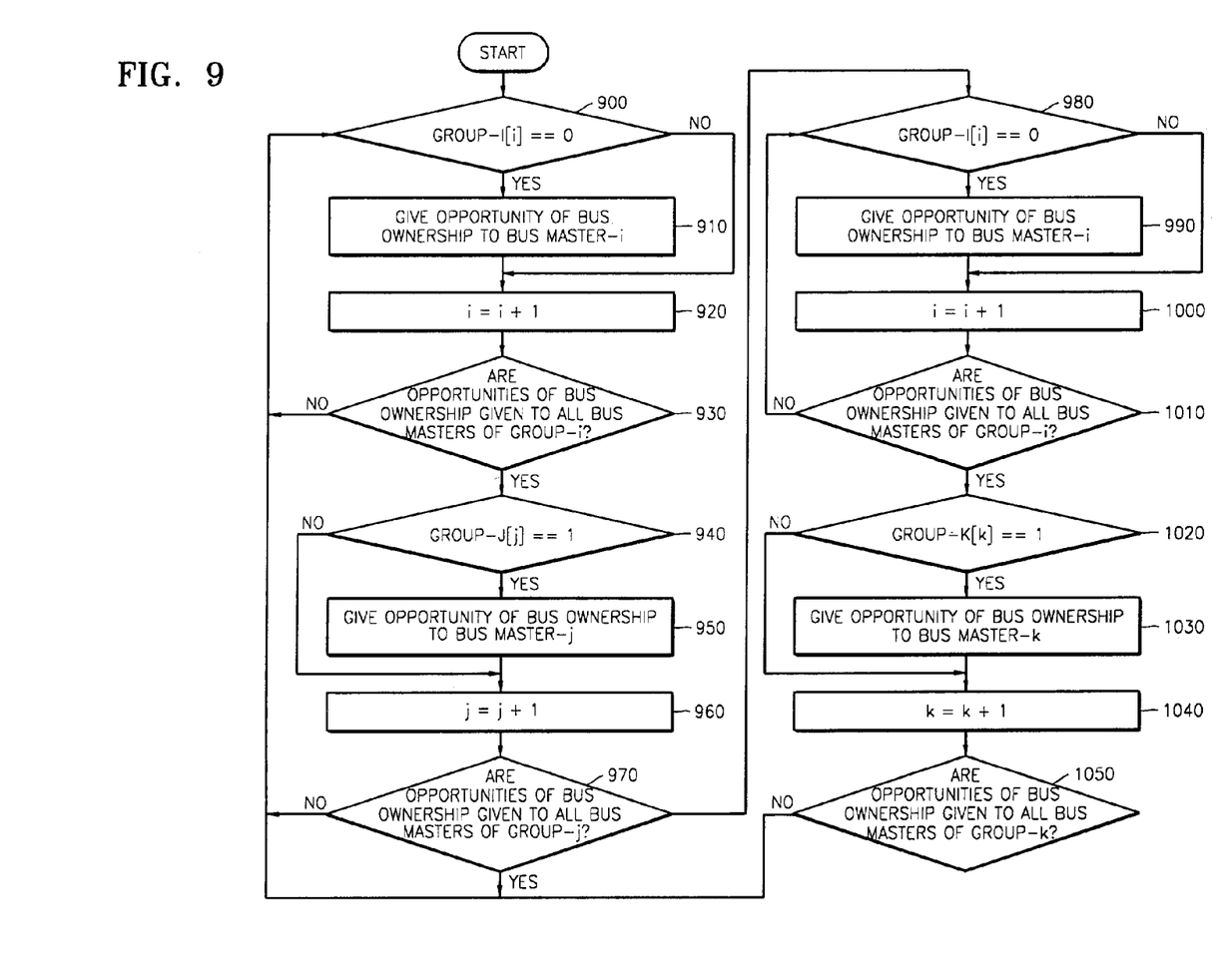
FIG. 9 is a flowchart of the steps of a bus arbitration method in which bus masters are grouped into three groups.

FIG. 9 is a flowchart of the steps of a bus arbitration method according to the present invention, in which bus masters are grouped into three groups. Referring to FIGS. 8 and 9, the bus arbitration method in which bus masters are grouped into three groups will now be explained.

An example in which the bus arbiter 70 is programmed so that bus master (A) is included in Group I, each bus master (B, C, D) is included in Group J, and each bus master (E, F) is included in Group K will now be explained. It is assumed that bus master (A) is expressed as 0, bus masters (B, C, D) are expressed as 1, 2, and 3, respectively, and bus masters (E, F) are expressed as 4, and 5, respectively. Here, it is assumed that i is 0, j is a number from 1 to 3, and k is one of 4 and 5.

First, it is determined whether or not a bus master is included in Group I in step 900. If the determination result of step 900 is "Yes", step 910 is performed, and if the result is "No", step 920 is performed. If i is 0 in step 900, bus master A is included in Group I. Accordingly, a bus ownership opportunity is given to bus master A in step 910, and i increases by 1 in step 920.

It is determined whether or not bus ownership opportunities have been given to all bus masters of Group I in step 930. According to the determination result of step 930, step 900 or 940 is performed. Here, since bus ownership opportunities have been given to all bus masters of Group I, step 940 is performed.

In step 940, it is determined whether or not a bus master is included in Group J. If the determination result of step 940 is "Yes", step 950 is performed and if the result is "No", step 960 is performed. If j is 1 in step 940, bus master B is included in Group J. Accordingly, a bus ownership opportunity is given to bus master B in step 950, and j increases by 1 in step 960.

It is determined whether or not bus ownership opportunities have been given to all bus masters of Group J in step 970. According to the determination result of step 970, step 900 or 980 is performed. Since bus ownership opportunities have not been given to all bus masters of Group J, step 900 is performed again and another bus ownership opportunity is given to bus master A. Then, step 940 is performed again and a bus ownership opportunity is given to bus master C.

Then, by repeatedly performing steps 900 through 970, the bus arbiter 70 arbitrates the bus 15 in order of A->B->A->C->A->D.

Next, it is determined whether a bus master is included in Group I in step 980. If the determination result of step 980 is "Yes", step 990 is performed, and if the result is "No", step 1000 is performed. If i is 0 in step 980, bus master A is included in Group I. Accordingly, a bus ownership opportunity is given to bus master A in step 990, and i increases by 1 in step 1000.

In step 1010, it is determined whether or not bus ownership opportunities have been given to all bus masters of Group I. According to the determination result of step 1010, step 980 or 1020 is performed. Here, since bus ownership opportunities have been given to all bus masters of Group I, step 1020 is performed.

In step 1020, it is determined whether or not a bus master is included in Group K. If the determination result of step 1020 is "Yes", step 1030 is performed, and if the result is "No", step 1040 is performed. If k is 4 in step 1020, bus master E is included in Group K. Accordingly, a bus ownership opportunity is given to bus master E in step 1030, and k increases by 1 in step 1040.

In step 1050, it is determined whether or not bus ownership opportunities have been given to all bus masters of Group K. Regardless of the determination result of step 1050, step 900 is performed again.

Therefore, by repeatedly performing steps 900 through 1050 shown in FIG. 9, the bus arbiter 70 arbitrates the bus 15 in order of A->B->A->C->A->D->A->E->A->B>A->C->A->D->A->F.

Figure 10:
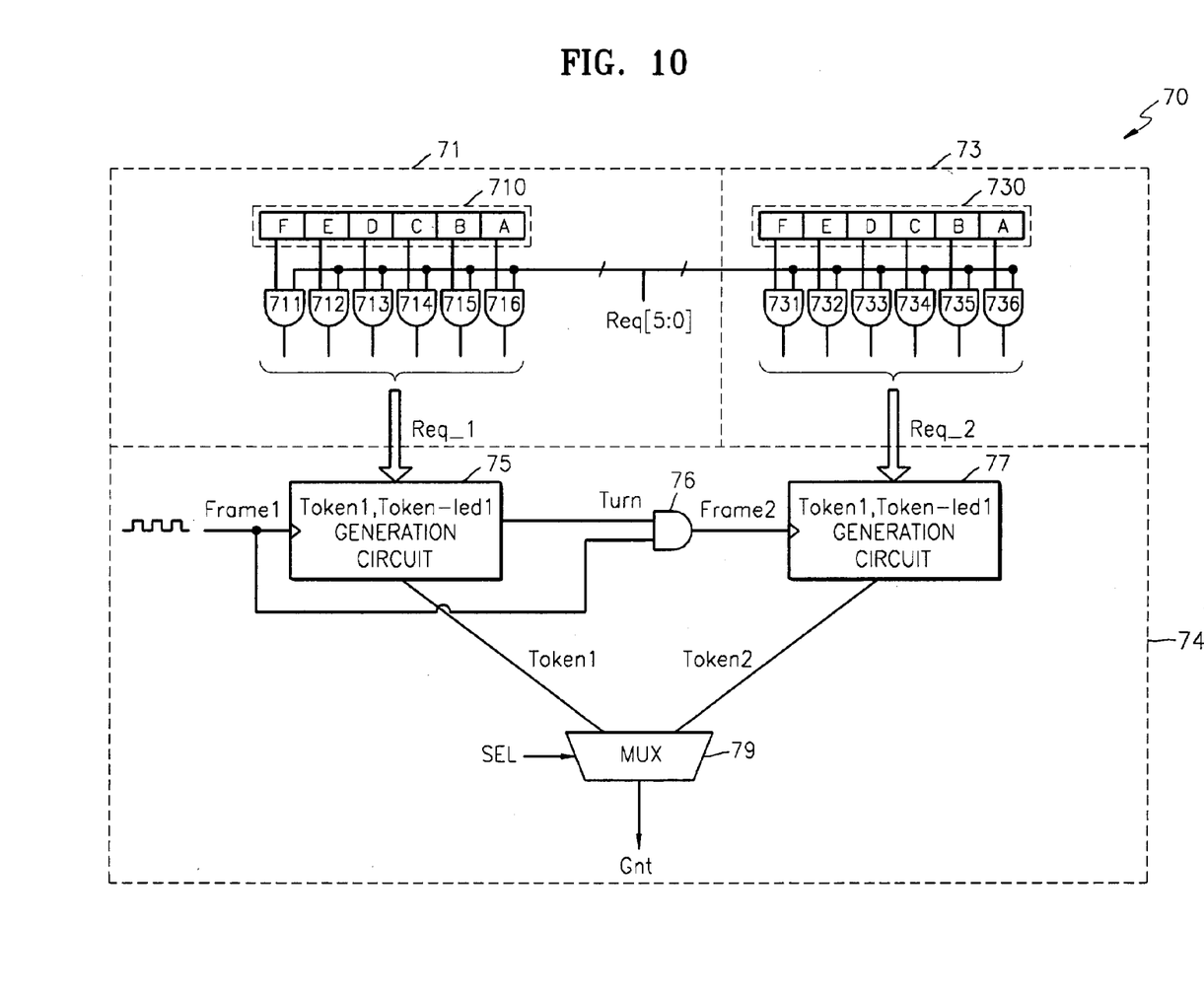
FIG. 10 is a block diagram of a bus arbiter according to a preferred embodiment of the present invention.

FIG. 10 is a block diagram of a bus arbiter according to a preferred embodiment of the present invention. Referring to FIG. 10, the bus arbiter 70 comprises a first register block 71, a second register block 73, and a grant signal generation circuit 74.

The grant signal generation circuit 74 comprises a first grant signal generation circuit 75, a second grant signal generation circuit 77, an AND gate 76, and a selection circuit 79. For convenience of explanation, FIG. 10 shows a case in which a plurality of bus masters are grouped into two groups; however, in alternative embodiments, the bus arbiter 70 may comprise a plurality of register blocks with more than 2 groups.

The grant signal generation circuit 74 receives the output signal of each register block, and in response to a control signal outputs a grant signal (Gnt) for granting ownership of the bus to a bus master corresponding to the control signal.

The first register block 71 comprises a Group I register block 710 and a plurality of AND gates 711 through 716. The Group I register block 710 comprises a plurality of registers and programs each bus master (A, B, C, D, E, F) belonging to Group I.

The first register block 71, in response to values programmed in the Group I register block 710 and an input request signal (Req[5:0]), outputs a first internal request signal (Req_1) to the first grant signal generation circuit 75.

The second register block 73 comprises a Group J register block 730 and a plurality of AND gates 731 through 736. The Group J register block 730 comprises a plurality of registers and programs each bus master (A, B, C, D, E, F) belonging to Group J.

The second register block 73, in response to values programmed in the Group J register block 730 and an input request signal (Req[5:0]), outputs a second internal request signal (Req_2) to the second grant signal generation circuit 77.

For example, when bus master (A) is programmed to belong to Group I and each bus master (B, C, D, E, F) is programmed to belong to Group J, bits of the Group I register block 710 shown in FIG. 10 corresponding to "FEDCBA" are programmed as "000001" and bits of the Group J register block 730 corresponding to "FEDCBA" are programmed as "111110". Therefore, the group register blocks 710 and 730 store information on bus masters belonging to Group I or Group J.

Accordingly, each of the plurality of register blocks stores information on bus masters belonging to a corresponding group by a predetermined program, that is, by software. Consequently, the frequency of ownership of the bus by each of the plurality of bus masters is determined by the information on the bus masters.

Each of the group register block 710 and 730 comprises a plurality of storage devices for storing information on bus masters belonging to a corresponding one of Group I and Group J. The plurality of logic gates receive request signals (Req[5:0]), which are output from the plurality of bus masters (A, B, C, D, E, F) through the bus 15, and corresponding output signals of the storage devices, perform logic operations on the respective received signal pairs, and output the result to the grant signal generation circuit 74.

Referring to FIGS. 1 and 10, if bus master (A) outputs a request signal (Req[5:0], that is, 000001) to the Group I register block 710 and Group J register block 730 of the bus arbiter 70, the output signals of the AND gates 711 through 716 are 000001 and the output signals of the AND gates 731 through 736 are 000000.

Also, when each bus master (A, B, C) is programmed to belong to Group I and each bus master (D, E, F) is programmed to belong to Group J, bits of the Group I register block 710 shown in FIG. 10 corresponding to "FEDCBA" are programmed as "000111" and bits of the Group J register block 730 corresponding to "FEDCBA" are programmed as "111000".

Figure 11:
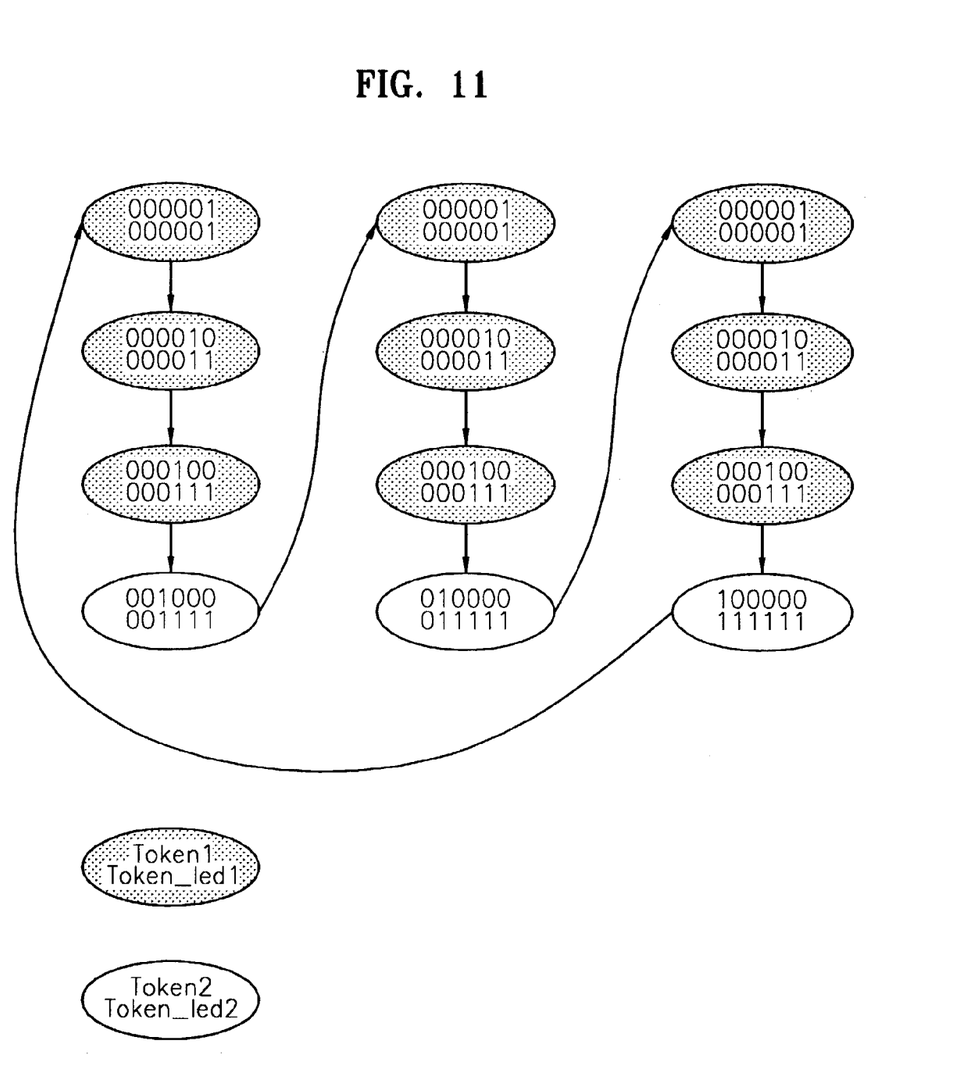
FIG. 11 is a state diagram showing allocation of control signals used in the bus arbitration method and the bus arbiter according to the present invention, and circulation of bus ownership according to bus arbitration result.
Figure 12:
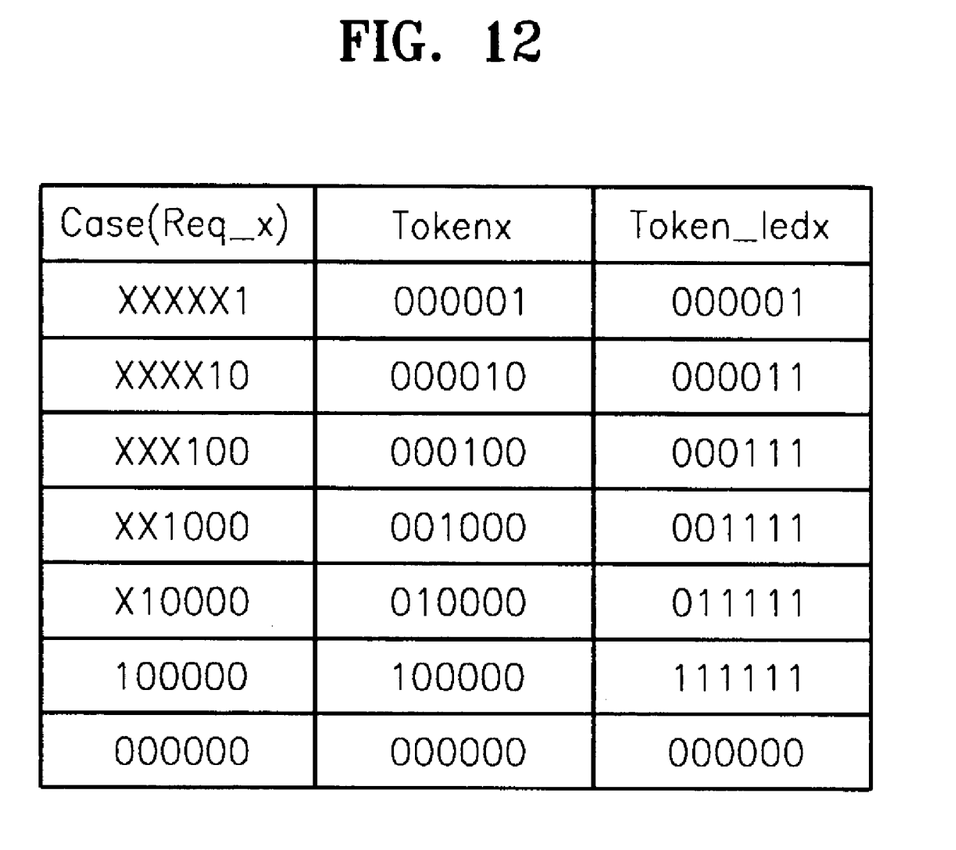
FIG. 12 is a table of logic values of control signals used in the bus arbitration method and the bus arbiter according to the present invention.

The first grant signal generation circuit 75 and the second grant signal generation circuit 77 perform operations as shown in FIGS. 11 and 12 and output the results (Token1, Token2) to the selection circuit 79.

The first grant signal generation circuit 75 is enabled in response to a first frame signal (Frame1), and generates Tokenx (x is 1) and Token_ledx (x is 1) as shown in FIG. 12 in response to the first internal request signal (Req_1). Here, the first frame signal (Frame1) is a signal indicating the start time (point) of bus arbitration.

Also, the second grant signal generation circuit 77 is enabled in response to a second frame signal (Frame2), and generates Tokenx (x is 2) and Token_ledx (x is 2) as shown in FIG. 12 in response to a second internal request signal (Req 2). Here, the second frame signal (Frame2) is a signal indicating the start time (point) of bus arbitration.

Each of the internal grant signal generation circuits 75 and 77 receives a corresponding enable signal (Frame1, Frame2) and the output signal (Req_1, Req_2) that is output from a corresponding register block 71 and 73, and outputs an internal grant signal (Token1, Token2) to the selection circuit 79.

The selection circuit 79 receives each of the internal grant signals (Token1, Token2) and outputs a grant signal (Gnt) to a corresponding bus master in response to a control signal (SEL).

It is preferable that each of the internal grant signal generation circuits 75 and 77 arbitrates ownership of the bus 15 among bus masters belonging to the same group by a round-robin method.

The AND gate 76 receives the first frame signal (Frame1) and a 1-turn indication signal (Turn), performs an AND operation, and outputs the result (Frame2) to the second grant signal generation circuit 77. Here, the 1-turn indication signal (Turn) is a signal indicating that a bus ownership opportunity is given in turn to all bus masters forming Group I.

It is preferable that when the AND gate 76 is used, the indication signal (Turn) is activated after bus ownership is given in turn to all bus masters. However, when an OR gate is used instead of the AND gate 76, it is preferable that the indication signal (Turn) is inactivated.

Therefore, after the same number of pulses as the number of bus master(s) forming Group I are generated, the AND gate 76 outputs the second frame signal (Frame2). The second frame signal (Frame2) is a pulse having a predetermined cycle and width, and the cycle and width of the second frame signal (Frame2) are the same as the cycle and width of the first frame signal (Frame1).

The selection signal 79 receives the first grant signal (Token1) and the second grant signal (Token2), and outputs a grant signal (Gnt) to a corresponding bus master (A, B, C, D, E, F) of FIG. 1 in response to the selection signal (SEL). The grant signal (Gnt) contains information on granting use of the bus 15.

FIG. 11 is a state diagram showing allocation of control signals used in the bus arbitration method and the bus arbiter according to the present invention, and circulation of bus ownership according to bus arbitration result. The circulation of bus ownership of FIG. 11 is the same as the circulation of FIG. 6. Here, bus masters (A, B, C, D, E, F) correspond to 000001, 000010, 000100, 001000, 010000, and 100000, respectively.

FIG. 12 is a table of logic values of control signals used in the bus arbitration method and the bus arbiter according to the present invention. Referring to FIGS. 11 and 12, Req_x (x is 1, 2) is the output signal from the Group I register block 710 and the Group J register block 730.

Tokenx (x is 1, 2) is formed by 6 bits, and the LSB of Tokenx corresponds to bus master (A) and the MSB of Tokenx corresponds to bus master (F). Tokenx is a signal indicating a bus master which receives the current grant signal (Gnt), and if a bit is 1, it means that the bus master corresponding to that bit is granted access to or use of the bus. Therefore, in the 6-bit Tokenx, only one bit can have the value 1.

Token_ledx (x is 1, 2) changes the bit of Tokenx (x is 1, 2) that grants bus access for implementing the round-robin method. Tokenx_ledx (x is 1, 2) is formed by 6 bits.

That is, a bus master accessing the bus sets the location of the bit corresponding to itself to "1" so that another grant is not given to that bus master. When all bus masters finish using the bus 15, all bits of Token_ledx (x is 1, 2) become "111111". Then, after all bits of Token_ledx (x is 1, 2) become "000000" again, bus arbitration begins all over again.

Here, for the convenience of explanation, Tokenx (x is 1, 2) and Token_ledx (x is 1, 2) are formed by 6 bits, respectively. In reality, Tokenx (x is a natural number) and Tokenx_ledx (x is a natural number) of the present invention may be formed by any number of n bits (where n is a natural number).

Referring to FIGS. 1, 6, 10, 11, and 12, the bus arbiter and bus arbitration method according to the present invention will now be explained in detail, taking as an example the case where the frequency of use of the bus 15 decreases in order of bus masters (A, B, C, D, E, F) and each bus master (A, B, C) is programmed to belong to Group I and each bus master (D, E, F) is programmed to belong to Group J.

First, bus masters (A, B, C, D, E, F) are grouped into two groups (that is, Group I and Group J) by a predetermined classification criterion (for example, frequency of use of the bus 15 by each bus master (A, B, C, D, E, F)) by a program (that is, by software).

Therefore, the registers (FEDCBA) of the Group I register block 710 of FIG. 10 are programmed as "000111" and the registers (FEDCBA) of the Group J register block 730 are programmed as "111000".

Referring to FIG. 11, when bus master (A) is granted ownership (or use) of the bus 15, Token1 is 000001 and Token_led1 is 000001. When bus master (B) is granted ownership (or use) of the bus 15, Token1 is 000010 and Token_led1 is 000011. Here, in order to prevent bus master (A) and bus master (B) from owning the bus 15 again, bits of Token_led1 corresponding to bus master (A) and bus masters (B) are set to 1, thus yielding the result Token_led1=000011. By the time bus master (F) is granted the ownership of the bus 15, Token2 will be 100000 and Token_led2 will be 111111.

The first grant signal generation circuit 75 and the second grant signal generation circuit 77 of FIG. 10 output respective results (Token1, Token2) to the selection circuit 79 in accordance with the logic table shown in FIG. 12.

When the first internal request signal (Req_1) is xxxxx1, the first grant signal generation circuit 75 outputs 000001 to the selection circuit 79, and the selection circuit 79 outputs a grant signal (Gnt) for granting use of the bus to bus master (A) in response to the selection signal (SEL). Similarly, when the second internal request signal (Req_2) is xx1000, the second grant signal generation circuit 77 outputs 001000 to the selection circuit 79, and the selection circuit 79 outputs a grant signal (Gnt) for granting use of the bus to bus master (D) in response to the selection signal (SEL). The detailed operation of the bus arbiter 70 according to the present invention can be readily understood by referring to FIGS. 1, 6, 10, 11, and 12.

As described above, the bus arbitration method and the bus arbiter using the same according to the present invention can freely adjust the distribution of ownership of a bus among a plurality of bus masters according to an application.

Therefore, the performance of a bus system can be optimized for any particular application by a program, that is, by software.

While this invention has been particularly shown and described with references to preferred embodiments thereof, it will be understood by those skilled in the art that various changes in form and details may be made herein without departing from the spirit and scope of the invention as defined by the appended claims.

What is claimed is:

1. A method of arbitrating for ownership of a bus connected to
a plurality of bus masters, comprising:
grouping the plurality of bus masters into a plurality of groups according to the frequency of each bus master owning the bus, wherein at least one bus master of the plurality of bus masters is assignable to simultaneously belong to more than one group of the plurality of groups, and wherein each group of the plurality of groups generates an internal request signal; and
arbitrating ownership of the bus by each bus master according to the grouping, wherein each bus arbitration comprises:
generating an internal grant signal and a bus master selection signal in response to each internal request signal, wherein the bus master selection signal indicates when a bus master among the plurality of bus masters has been granted access to the bus;
outputting a notification signal when each bus master in a group of bus masters has been granted access to the bus; and
outputting at least one grant signal from at least one selected internal grant signal.

2. The method of claim 1, wherein each of the plurality of groups has a priority that is different than the priorities of the others.

3. The method of claim 1, wherein in arbitrating ownership of the bus by each bus master, arbitration of ownership of the bus by bus masters belonging to the same group is performed according to a round-robin method.

4. A method of arbitrating for ownership of a bus, comprising:
grouping a plurality of bus masters into a plurality of groups according to the frequency of each bus master owning the bus, wherein at least one bus master of the plurality of bus masters is assignable to simultaneously belong to more than one group of the plurality of groups, and wherein each group of the plurality of groups generates an internal request signal; and
arbitrating the frequency of each bus master owning the bus according to which of the plurality of groups each bus master belongs, wherein each bus arbitration comprises:
generating an internal grant signal and a bus master selection signal in response to each internal request signal, wherein the bus master selection signal indicates when a bus master among the plurality of bus masters has been granted access to the bus;
outputting a notification signal when each bus master in a group of bus masters has been granted access to the bus; and
outputting at least one grant signal from at least one selected internal grant signal.

5. The method of claim 4, wherein each of the plurality of groups has a priority that is different than the priorities of the others.

6. The method of claim 4 wherein in arbitrating the frequency of each bus master owning the bus, arbitration of ownership of the bus by each bus master among bus masters in the same group is performed according to a round-robin method.

7. The method of claim 4, wherein in grouping the bus masters, the plurality of bus masters are grouped into the plurality of groups according to a program.

8. A method of arbitrating for ownership of a bus between a plurality of bus masters in a bus system including the bus, the plurality of bus masters and a bus arbiter which arbitrates the ownership of the bus between the plurality of bus masters all being connected to the bus, the method comprising:
grouping the plurality of bus masters into a plurality of groups according to the frequency of each bus master owning the bus, wherein at least one bus master of the plurality of bus masters is assignable to simultaneously belong to more than one group of the plurality of groups, wherein each group of the plurality of groups generates an internal request signal; and
arbitrating ownership of the bus by each bus master according to the group to which each bus master belongs, wherein the ownership of the bus is arbitrated according to a priority method between bus masters of different groups and according to a round-robin method between bus masters belonging to the same group, wherein each bus arbitration comprises:
generating an internal grant signal and a bus master selection signal in response to each internal request signal, wherein the bus master selection signal indicates when a bus master among the plurality of bus masters has been granted access to the bus;
outputting a notification signal when each bus master in a group of bus masters has been granted access to the bus; and
outputting at least one grant signal from at least one selected internal grant signal.

9. A bus arbiter for arbitrating ownership of a bus connected to each of a plurality of bus masters, the bus arbiter comprising:
a plurality of register blocks, each register block generating an internal request signal; and
a grant signal generation circuit which receives the internal request signal from each of the plurality of register blocks, and, during bus arbitration, outputs a grant signal for granting ownership of the bus to a corresponding bus master in response to a control signal, wherein the plurality of bus masters are grouped into a plurality of groups according to the frequency of each bus master owning the bus, wherein at least one bus master of the plurality of bus masters is assignable to simultaneously belong to more than one group of the plurality of groups, and wherein each of the plurality of register blocks stores information related to bus masters belonging to a corresponding group, and wherein the grant signal generation circuit generates an internal grant signal and a bus master selection signal in response to each internal request signal, wherein the bus master selection signal indicates when a bus master of the plurality of bus masters has been granted access to the bus, and wherein the grant signal generation circuit outputs a notification signal when each bus master in a group of bus masters has been granted access to the bus.

10. The bus arbiter of claim 9, wherein the information related to the plurality of bus masters is stored in the plurality of register blocks according to a program.

11. The bus arbiter of claim 9, wherein the frequency of each of the plurality of bus masters owning the bus is determined according to the information of the bus master.

12. The bus arbiter of claim 9, wherein each of the plurality of register blocks comprises:
a group register block including a plurality of storage devices for storing information on the bus masters belonging to a group corresponding to itself; and
a plurality of logic gates which receives request signals output from the plurality of bus masters through the bus and output signals of the storage devices, performs logic operations, and outputs the internal request signals to the grant signal generation circuit.

13. The bus arbiter of claim 9, wherein the grant signal generation circuit comprises:
a plurality of internal grant signal generation circuits, each of which receives a corresponding enable signal and an internal request signal output from a corresponding register block, and outputs an internal grant signal; and
a selection circuit which receives respective internal grant signals, and outputs the grant signal to a corresponding bus master in response to the control signal.

14. The bus arbiter of claim 13, wherein each of the plurality of internal grant signal generation circuits performs arbitration for ownership of the bus among bus masters belonging to the same group according to a round-robin method.

15. A bus arbiter comprising;
a plurality of register blocks, each of which stores information related to a plurality of bus masters belonging to a corresponding one of a plurality of groups according to the frequency of each bus master owning the bus, wherein at least one bus master of the plurality of bus masters is assignable to simultaneously belong to more than one group of the plurality of groups, and each register block generating an internal request signal; and a grant signal generation circuit which outputs a grant signal for granting ownership of a bus connected to each of the plurality of bus masters to a corresponding bus master in response to the internal request signal of the corresponding register block, and wherein the grant signal generation circuit generates an internal grant signal and a bus master selection signal in response to each internal request signal, wherein the bus master selection signal indicates when a bus master of the plurality of bus masters has been granted access to the bus, and wherein the grant signal generation circuit outputs a notification signal when each bus master in a group of bus masters has been granted access to the bus.

16. The bus arbiter of claim 15, wherein each of the plurality of register blocks stores information related to the plurality of bus masters belonging to the corresponding group in a predetermined program.

17. The bus arbiter of claim 15, wherein the frequency of each of the plurality of bus masters owning the bus is determined according to the information of the bus master.

18. The bus arbiter of claim 15, wherein the grant signal generation circuit outputs the grant signal to a corresponding bus master in a predetermined order.

19. A bus system comprising:
a bus;
a bus arbiter connected to the bus; and
a plurality of bus masters, each of which is connected to the bus and outputs a request signal requesting ownership of the bus to the bus arbiter through the bus,
wherein the bus arbiter comprises:
a plurality of register blocks, each of which stores information related to bus masters belonging to a corresponding one of a plurality of groups, the bus masters being grouped into the plurality of groups according to the frequency of each bus master owning the bus, wherein at least one bus master of the plurality of bus masters is assignable to simultaneously belong to more than one group of the plurality of groups, and each register block generating an internal request signal; and a grant signal generation circuit which outputs a grant signal for granting ownership of the bus to a corresponding bus master in response to the request signal input from the corresponding bus master, and wherein the grant signal generation circuit generates an internal grant signal and a bus master selection signal in response to each internal request signal, wherein the bus master selection signal indicates when a bus master of the plurality of bus masters has been granted access to the bus, and wherein the grant signal generation circuit outputs a notification signal when each bus master in a group of bus masters has been granted access to the bus.

20. The bus system of claim 19, wherein each of the plurality of register blocks stores information related to the bus masters belonging to the corresponding group in a predetermined program.

21. The bus system of claim 19, wherein the frequency of ownership of the bus by each of the plurality of bus masters is determined by information related to the bus master.

22. The bus system of claim 19, wherein the grant signal generation circuit outputs the grant signal to a corresponding bus master in response to the request signal in a predetermined order.

23. The method of claim 1, wherein at least one of the bus masters is assigned to simultaneously belong to more than one group of the plurality of groups.

24. The method of claim 4, wherein at least one of the bus masters is assigned to simultaneously belong to more than one group of the plurality of groups.

25. The method of claim 8, wherein at least one of the bus masters is assigned to simultaneously belong to more than one group of the plurality of groups.

26. The bus arbiter of claim 9, wherein at least one of the bus masters is assigned to simultaneously belong to more than one group of the plurality of groups.

27. The bus arbiter of claim 15, wherein at least one of the bus masters is assigned to simultaneously belong to more than one group of the plurality of groups.

28. The bus system of claim 19, wherein at least one of the bus masters is assigned to simultaneously belong to more than one group of the plurality of groups.

* * * * *